(12) United States Patent
Kim et al.

(10) Patent No.: US 10,347,940 B2
(45) Date of Patent: Jul. 9, 2019

(54) ELECTROLYTE FOR RECHARGEABLE LITHIUM BATTERY AND RECHARGEABLE LITHIUM BATTERY INCLUDING THE SAME

(71) Applicant: SAMSUNG SDI CO., LTD., Yongin-si, Gyeonggi-do (KR)

(72) Inventors: Yun-Hee Kim, Yongin-si (KR);
Ho-Seok Yang, Yongin-si (KR);
Min-Young Lee, Yongin-si (KR);
Se-Jeong Park, Yongin-si (KR);
Hyun-Woo Kim, Yongin-si (KR);
Su-Jeong Koh, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 248 days.

(21) Appl. No.: 15/266,549

(22) Filed: Sep. 15, 2016

(65) Prior Publication Data

US 2017/0288268 A1    Oct. 5, 2017

(30) Foreign Application Priority Data

Apr. 4, 2016 (KR) .................. 10-2016-0041081

(51) Int. Cl.
| | | |
|---|---|---|
| *H01M 10/0567* | (2010.01) | |
| *H01M 10/0525* | (2010.01) | |
| *H01M 10/0569* | (2010.01) | |
| *H01M 10/052* | (2010.01) | |
| *H01M 10/0568* | (2010.01) | |

(52) U.S. Cl.
CPC ..... *H01M 10/0567* (2013.01); *H01M 10/052* (2013.01); *H01M 10/0525* (2013.01); *H01M 10/0569* (2013.01); *H01M 10/0568* (2013.01); *H01M 2300/0025* (2013.01); *H01M 2300/0031* (2013.01); *Y02T 10/7011* (2013.01)

(58) Field of Classification Search
CPC ......... H01M 10/0567; H01M 10/0569; H01M 10/0568; H01M 10/0525; H01M 10/052; H01M 2300/0025; H01M 2300/0031
See application file for complete search history.

(56) References Cited

U.S. PATENT DOCUMENTS

| | | |
|---|---|---|
| 2007/0287071 A1 | 12/2007 | Chiga et al. |
| 2010/0035146 A1 | 2/2010 | Fujii et al. |
| 2013/0089794 A1 | 4/2013 | Kim |
| 2014/0072865 A1 | 3/2014 | Sur et al. |

FOREIGN PATENT DOCUMENTS

| | | | |
|---|---|---|---|
| CN | 105742709 | * | 7/2016 |
| JP | 2008140760 A | | 6/2008 |
| KR | 10-2009-0095577 | | 9/2009 |
| KR | 10-2013-0039294 | | 4/2013 |
| KR | 10-2014-0032918 | | 3/2014 |
| KR | 10 20150022653 | * | 3/2015 |

* cited by examiner

*Primary Examiner* — Laura Weiner
(74) *Attorney, Agent, or Firm* — Lee & Morse, P.C.

(57) ABSTRACT

An electrolyte for a rechargeable lithium battery includes an organic solvent including C3 to C5 alkyl propionate, and the electrolyte further includes a lithium salt and a compound represented by Chemical Formula 1,

[Chemical Formula 1]

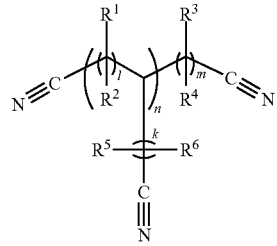

wherein, in Chemical Formula 1, k, l, and m are independently integers of 0 to 20, k, l, and m are selected, so that Chemical Formula 1 has an asymmetric structure, n is an integer of 1 to 7, and $R^1$, $R^2$, $R^3$, $R^4$, $R^5$, and $R^6$ are independently hydrogen, an alkyl group, an alkoxy group, or a fluoroalkyl group.

14 Claims, 7 Drawing Sheets

ELECTROLYTE FOR RECHARGEABLE LITHIUM BATTERY AND RECHARGEABLE LITHIUM BATTERY INCLUDING THE SAME

CROSS-REFERENCE TO RELATED APPLICATION

Korean Patent Application No. 10-2016-0041081, filed on Apr. 4, 2016, in the Korean Intellectual Property Office, and entitled: "Electrolyte for Rechargeable Lithium Battery and Rechargeable Lithium Battery Including the Same," is incorporated by reference herein in its entirety.

BACKGROUND

1. Field

Embodiments relate to an electrolyte for a rechargeable lithium battery and a rechargeable lithium battery including the same.

2. Description of the Related Art

A rechargeable lithium battery has recently drawn attention as a power source for small portable electronic devices. The rechargeable lithium battery uses an organic electrolyte solution and thereby, have twice as high a discharge voltage as a conventional battery using an alkali aqueous solution and accordingly, high energy density.

As for a positive active material of a rechargeable lithium battery, an oxide having a structure capable of intercalating lithium ions, such as $LiCoO_2$, $LiMn_2O_4$, $LiNi_{1-x}Co_xO_2$ (0<x<1), and the like has been used. As for a negative active material of a rechargeable lithium battery, various carbon-based materials such as artificial graphite, natural graphite, and hard carbon, which intercalate and deintercalate lithium ions have been used.

As a rechargeable lithium battery having high energy density such as a battery for an electrical vehicle has been recently more demanded, research on increasing active mass density of an electrode, a driving voltage, and the like in order to realize high capacity and high energy density has been made. However, reactivity between an active material and an electrolyte solution is increased, thus a capacity retention is deteriorated during a cycle, and thermal durability is also deteriorated at a high temperature, and resultantly, a cell is severely swollen. In addition, as active mass of an electrode is increased, impregnation of the electrolyte solution is relatively deteriorated, thus movement of lithium ions is reduced, a SEI film of a negative electrode is non-uniformly formed, and Li-plating occurs, and thus a cycle life is deteriorated.

In general, when an electrolyte has a wider potential window than a potential difference between a positive active material and a negative active material, a reaction on the interface of the active material with the electrolyte may be suppressed. However, when an active material for a high voltage is used to increase energy density of a battery, the electrolyte has a narrower potential window than the active material. Accordingly, a protective layer may be formed to prevent the electrolyte from directly contacting the electrode active material and thus suppress decomposition of the electrolyte, and thus capacity may be maintained for a long term cycle.

As a battery is required of high-capacity and a high voltage, thermal durability is very important to secure for battery safety. Accordingly, an attempt to enhance the battery safety is being made by improving thermal durability of a battery, for example, improving electrochemical characteristics and thermal safety of a solvent, using an additive to delay ignition of the battery, decreasing thickness change of the battery, and the like.

SUMMARY

Embodiments are directed to an electrolyte for a rechargeable lithium battery, the electrolyte including an organic solvent including C3 to C5 alkyl propionate, a lithium salt, and a compound represented by Chemical Formula 1:

[Chemical Formula 1]

In Chemical Formula 1, k, l, and m may independently be integers of 0 to 20, k, l, and m being selected so that Chemical Formula 1 has an asymmetric structure, n may be an integer of 1 to 7, and $R^1$, $R^2$, $R^3$, $R^4$, $R^5$, and $R^6$ may independently be hydrogen, an alkyl group, an alkoxy group, or a fluoroalkyl group.

The C3 to C5 alkyl propionate may be included in an amount of about 10 volume % to about 80 volume % based on the total amount of the organic solvent.

The C3 to C5 alkyl propionate may include one or more of propyl propionate, N-butyl propionate, tert-butyl propionate, isobutyl propionate, N-pentyl propionate, 2-pentyl propionate, tert-pentyl propionate, or isopentyl propionate.

The compound represented by Chemical Formula 1 may be included in an amount of about 0.05 wt % to about 10 wt % based on the total weight of the electrolyte for a rechargeable lithium battery.

The compound represented by Chemical Formula 1 may include one or more of hexane tricyanide, pentane tricyanide, or fluorohexane tricyanide.

The electrolyte may further include succinonitrile.

In Chemical Formula 1, n may be an integers of 1 to 5, and k, l, and m may independently be integers of 0 to 10.

In Chemical Formula 1, n may be an integer of 1 to 3, and k, l, and m may independently be integers of 0 to 7.

In Chemical Formula 1, n may be 1 or 2, k may be 0, and l and m may independently be integers of 1 to 5.

In Chemical Formula 1, k, l, and m may be different integers from each other.

The lithium salt may include $LiPF_6$, $LiBF_4$, $LiSbF_6$, $LiAsF_6$, $LiN(SO_2CF_3)_2$, $LiN(SO_3C_2F_5)_2$, $LiC_4F_9SO_3$, $LiClO_4$, $LiAlO_2$, $LiAlCl_4$, $LiN(C_yF_{2x+1}SO_2)(C_yF_{2y+1}SO_2)$, wherein x and y are natural numbers, LiCl, LiI, $LiB(C_2O_4)_2$, or a combination thereof.

A concentration of the lithium salt may be about 0.1 M to about 2.0 M.

The electrolyte for a rechargeable lithium battery may include one or more additives selected from fluoroethylene carbonate, vinylethylene carbonate, succinonitrile, polysulfone, and a combination thereof.

Embodiments are also directed to a rechargeable lithium battery, including a negative electrode including a negative active material, a positive electrode including a positive active material, and the electrolyte according to an embodiment.

The rechargeable lithium battery may be operated at a voltage of about 4.4 V or greater.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art.

In the drawing figures, the dimensions of layers and regions may be exaggerated for clarity of illustration. Like reference numerals refer to like elements throughout.

In an embodiment, an electrolyte for a rechargeable lithium battery includes an organic solvent including C3 to C5 alkyl propionate. The electrolyte further includes a lithium salt and a compound represented by Chemical Formula 1.

[Chemical Formula 1]

In Chemical Formula 1, k, l, and m are independently integers of 0 to 20, k, l, and m are selected so that Chemical Formula 1 has an asymmetric structure. Also, n is an integer of 1 to 7, and $R^1$, $R^2$, $R^3$, $R^4$, $R^5$, and $R^6$ are same or different, and independently hydrogen, an alkyl group, an alkoxy group, or a fluoroalkyl group.

The electrolyte for a rechargeable lithium battery may exhibit low viscosity, excellent ion conductivity, and an excellent suppression effect on gas generation under a high voltage and a high temperature condition, and thus may effectively mitigate cell swelling at high temperature, and may improve cycle life characteristics, for example, in a high voltage battery of greater than or equal to about 4.4 V.

The C3 to C5 alkyl propionate may be a propionic ester linked with a C3 to C5 alkyl group, and may be, for example, propyl propionate, N-butyl propionate, tert-butyl propionate, isobutyl propionate, N-pentyl propionate, 2-pentyl propionate, tert-pentyl propionate, or isopentyl propionate, which may be used individually or in combination.

The C3 to C5 alkyl propionate may be included in an amount of, for example, about 10 volume % to about 80 volume %, for example about 20 volume % to about 80 volume %, about 30 volume % to about 70 volume %, or about 40 volume % to about 60 volume % based on the total amount of the organic solvent.

The organic solvent may further include, for example, a carbonate-based solvent, an ester-based solvent, an ether-based solvent, a ketone-based solvent, an alcohol-based solvent, an aprotic solvent, or a combination thereof as a non-aqueous organic solvent.

The carbonate-based solvent may be dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, which may be used individually or in combination.

The ester-based solvent may be methyl acetate, ethyl acetate, n-propyl acetate, dimethylacetate, methylpropionate, ethylpropionate, decanolide, mevalonolactone, caprolactone, and the like, which may be used individually or in combination.

The ether-based solvent may be dibutyl ether, tetraglyme, diglyme, dimethoxyethane, 2-methyltetrahydrofuran, tetrahydrofuran, and the like, which may be used individually or in combination. The ketone-based solvent may be cyclohexanone, and the like. The alcohol-based solvent may be ethanol, isopropyl alcohol, and the like, which may be used individually or in combination. The aprotic solvent may be nitriles, amides such as dimethyl formamide, dioxolanes such as 1,3-dioxolane, sulfolanes, and the like, which may be used individually or in combination.

The organic solvent may be used alone or in a mixture. When the organic solvent is used in a mixture, the mixture ratio may be controlled in accordance with a desirable battery performance.

The carbonate-based solvent may include a mixture with a cyclic carbonate and a linear carbonate. The cyclic carbonate and linear carbonate may be mixed together in a volume ratio of about 1:1 to about 1:9.

The organic solvent may further include an aromatic hydrocarbon-based solvent as well as the carbonate-based solvent. The carbonate-based solvent and aromatic hydrocarbon-based solvent may be mixed together in a volume ratio of, for example, about 1:1 to about 30:1.

Specific examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, and xylene, which may be used individually or in combination.

The electrolyte for a rechargeable lithium battery may further include an additive of vinylene carbonate or an ethylene-based carbonate compound, which may help improve cycle life of a battery.

Examples of the ethylene carbonate-based compound include difluoroethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate, which may be used individually or in combination.

The lithium salt dissolved in an organic solvent supplies a battery with lithium ions to operate the rechargeable lithium battery, and helps improve transportation of the lithium ions between positive and negative electrodes.

Examples of the lithium salt include, for example, $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, for example integers ranging from 1 to 20), LiCl, LiI, and $LiB(C_2O_4)_2$ (lithium bis(oxalato) borate: LiBOB), which may be used individually or in combination.

The lithium salt may be used in a concentration ranging from, for example, about 0.1 M to about 2.0 M. When the lithium salt is included at the above concentration range, an electrolyte may have excellent performance and lithium ion mobility due to optimal electrolyte conductivity and viscosity.

The compound represented by Chemical Formula 1 may be an electrolyte additive including greater than or equal to about three nitrile groups (—CN) and having an asymmetric structure. The compound represented by Chemical Formula 1 may have a very low bonding energy with metal ions in a battery, and thus may form a stable and strong bonding with the metal ions, and significantly reduce a thickness change of the battery by a high temperature storage and a thermal impact.

The compound represented by Chemical Formula 1 may have a very strong bond with the surface of the positive active material and thus may form a protective layer having a strong bonding force on the surface of the positive active material layer. Accordingly, the compound may help to effectively prevent the electrolyte from directly contacting a positive electrode, suppress the electrolyte from being decomposed in the positive electrode even though a battery is stored at a high temperature or continuously charged and discharged, and thus help mitigate battery expansion (swelling). In addition, the compound represented by Chemical Formula 1 may help suppress a battery thickness change when a thermal impact is applied to the battery and thus improve thermal impact durability of the battery.

In Chemical Formula 1, the "asymmetric structure" indicates that the compound of Chemical Formula 1 is asymmetric with a reference to a central carbon, that is, carbon in the middle of Chemical Formula 1.

In an example embodiment, k, l, and m may be different integers from each other.

In Chemical Formula 1, n may be an integer of 1 to 5 and k, l, and m may independently be integers of 0 to 10. For example, n may be an integer of 1 to 3, and k, l, and may independently be integers of 0 to 7. For example, n may be 1 or 2, k may be 0, and 1 and m may independently be integers of 1 to 5. For example, n may be 1, k may be 0, l may be 2, and m may be 3.

The compound represented by Chemical Formula 1 may include about 3 to about 9 nitrile groups, for example, about 3 to about 7, about 3 to about 5, or about 3 nitrile groups.

The compound represented by Chemical Formula 1 may have very low bonding energy with metal ions in the battery and thus help form a more stable and stronger bond with the metal ions and resultantly, show a larger effect on decreasing a battery thickness change by a thermal impact compared with a hydrocarbon compound having less than or equal to about 2 nitrile groups or similar compounds having a symmetrical structure with a reference to one nitrile group in the middle of their backbones.

The compound represented by Chemical Formula 1 may be, for example hexane tricyanide, pentane tricyanide, or fluorohexane tricyanide, and specifically 1,3,6-hexane tricyanide, or 1,2,6-hexane tricyanide.

The compound represented by Chemical Formula 1 may be included in an amount of, for example, about 0.05 wt % to about 10 wt %, specifically about 0.1 wt % to about 10 wt %, about 0.1 wt % to about 7 wt %, about 0.1 wt % to about 5 wt %, or about 1 wt % to about 5 wt % based on the total weight of the electrolyte for a rechargeable lithium battery. The electrolyte for a rechargeable lithium battery may have desirable viscosity and ion conductivity, and may effectively suppress gas generation under a high voltage high temperature condition and thus improve cycle life characteristics of a battery.

The electrolyte for a rechargeable lithium battery may further include an additive. For example, the electrolyte for a rechargeable lithium battery may include one or more of fluoroethylene carbonate, vinylethylene carbonate, succinonitrile, polysulfone, or a combination thereof. This additive may help formation of a film on a negative electrode as well as a positive electrode, and thus help suppress gas generation from the positive and negative electrodes when stored at a high temperature.

When the additive is used, the additive may be used in an amount of, for example, about 0.01 wt % to about 20 wt %, for example, about 0.1 wt % to about 10 wt % or about 0.1 wt % to about 5 wt % based on the total weight of the electrolyte. When the additive is used within the range, the electrolyte may have a minimized film resistance increase and contribute to improving battery performance.

The electrolyte according to an embodiment may be usefully applied to a battery operated at a greater than or equal to about 4.35 V, for example, about 4.4 V. In general, a battery for a high voltage of greater than or equal to about 4.35 V may more actively generate gas through a reaction of an active material with an electrolyte, but the electrolyte according to an embodiment may help suppress gas generation in a high voltage battery and thus help improve cycle life characteristics of the battery.

Another embodiment provides a rechargeable lithium battery including a positive electrode including a positive active material, a negative electrode including a negative active material, and the electrolyte.

The rechargeable lithium battery may be classified into a lithium ion battery, a lithium ion polymer battery, and a lithium polymer battery depending on kinds of a separator and an electrolyte The rechargeable lithium battery may be cylindrical, prismatic, coin-type, pouch-type, and the like depending on shape or may be bulk type and thin film type.

Figure 1:
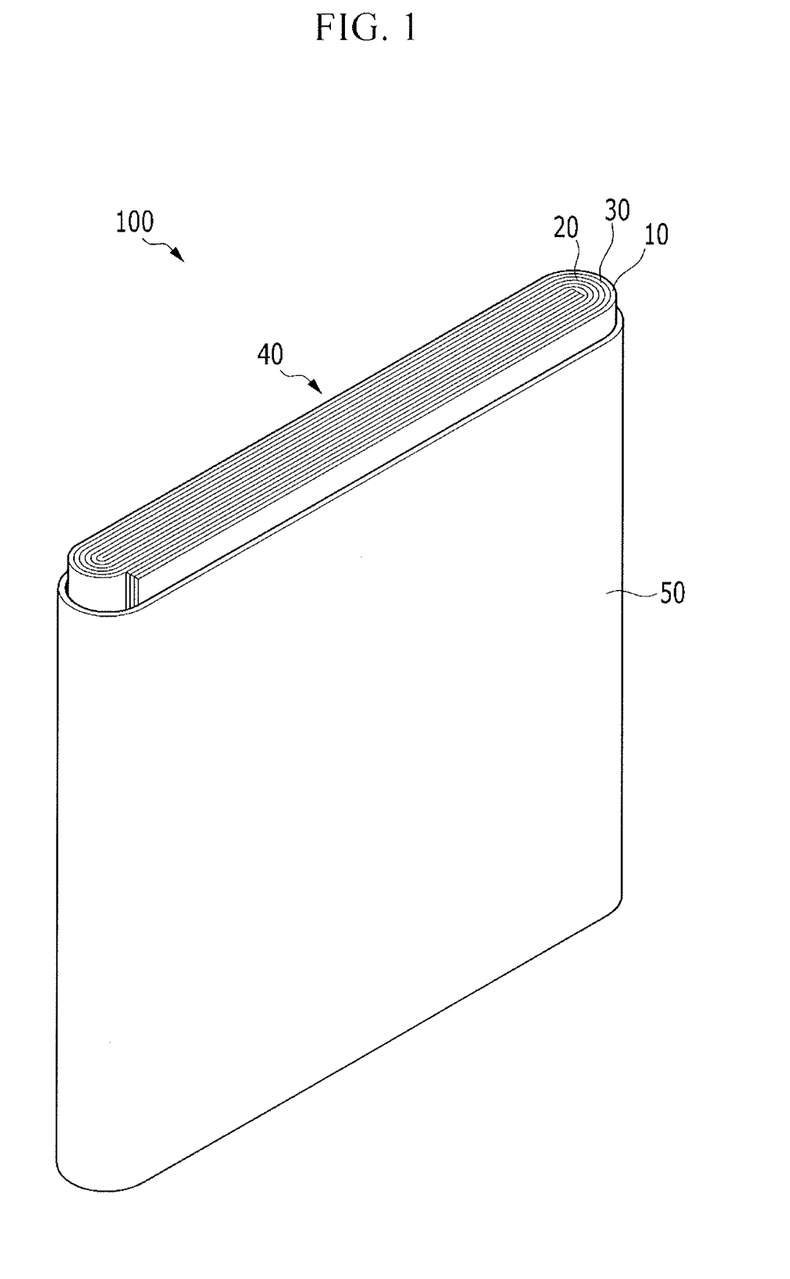
FIG. 1 illustrates a schematic view showing the structure of a rechargeable lithium battery according to an embodiment.

FIG. 1 is an exploded perspective view showing a prismatic rechargeable lithium battery according to an embodiment. Referring to FIG. 1, a rechargeable lithium battery 100 includes a wound electrode assembly 40 including a separator 30 interposed between a positive electrode 10 and a negative electrode 20, and a case 50 housing the electrode assembly 40. In another implementation, a stacked electrode assembly may be used. The positive electrode 10, the negative electrode 20, and/or the separator 30 may be impregnated with the electrolyte solution.

The positive electrode 10 includes a positive current collector and a positive active material layer formed on the positive current collector. The positive active material layer may include, for example, a positive active material, a binder, a conductive material, etc.

The positive active material may use a compound that intercalates and deintercalates lithium. For example, a composite oxide or a composite phosphate of a metal selected from, for example, cobalt, manganese, nickel, aluminum, iron, or a combination thereof and lithium may be used. For example, the positive active material may use a lithium cobalt oxide, a lithium nickel oxide, a lithium manganese oxide, a lithium nickel cobalt manganese oxide, a lithium nickel cobalt aluminum oxide, a lithium iron phosphate, or a combination thereof.

The binder may improve binding properties of positive active material particles with one another and with a current collector. The binder may be, for example, polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, etc.

The conductive material may be included to provide electrode conductivity. A suitable electrically conductive material may be used as a conductive material. The conductive material may be, for example a carbon-based material such as natural graphite, artificial graphite, carbon black, acetylene black, ketjen black, and a carbon fiber, a metal-based material such as copper, nickel, aluminum, and silver, a conductive polymer such as a polyphenylene derivative, or a combination thereof.

The current collector may be, for example, aluminum.

The negative electrode 20 includes a current collector and a negative active material layer formed on the current collector, and the negative active material layer may include a negative active material, a binder, a conductive material, etc.

The negative active material may include a material that reversibly intercalates/deintercalates lithium ions, a lithium metal, a lithium metal alloy, a material being capable of doping and dedoping lithium, or a transition metal oxide.

The material that can reversibly intercalate/deintercalate lithium ions may include a carbon material, for example, crystalline carbon, amorphous carbon, and mixtures thereof. The crystalline carbon may be non-shaped, or plate shaped, flake shaped, spherical shaped, or fiber shaped natural graphite or artificial graphite. The amorphous carbon may be a soft carbon, a hard carbon, a mesophase pitch carbonization product, fired coke, and the like.

The lithium metal alloy may include lithium and an element selected from Na, K, Rb, Cs, Fr, Be, Mg, Ca, Sr, Si, Sb, Pb, In, Zn, Ba, Ra, Ge, Al, and Sn.

The material being capable of doping and dedoping lithium may include Si, a Si—C composite, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition element, a rare earth element, and a combination thereof, and not Si), Sn, $SnO_2$, a Sn—R alloy (wherein R is an element selected from an alkali metal, an alkaline-earth metal, a Group 13 element, a Group 14 element, a Group 15 element, a Group 16 element, a transition element, a rare earth element, and a combination thereof, and not Sn), and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The transition metal oxide may include vanadium oxide, lithium vanadium oxide, and the like.

The binder improves binding properties of negative active material particles with one another and with a current collector. The binder may include a non-water-soluble binder, a water-soluble binder, or a combination thereof.

The non-water-soluble binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a rubber-based binder or a polymeric resin binder. The rubber-based binder may be selected from a styrene-butadiene rubber, an acrylated styrene-butadiene rubber, an acrylonitrile-butadiene rubber, an acrylic rubber, a butyl rubber, a fluorine rubber, and a combination thereof. The polymeric resin binder may be selected from polytetrafluoroethylene, polyethylene, polypropylene, ethylene-propylene copolymer, polyethyleneoxide, polyvinylpyrrolidone, polyepichlorohydrin, polyphosphazene, polyacrylonitrile, polystyrene, an ethylenepropylenediene copolymer, polyvinylpyridine, chlorosulfonated polyethylene, a latex, a polyester resin, an acrylic resin, a phenolic resin, an epoxy resin, polyvinyl alcohol and a combination thereof.

The conductive material may be the same as described above.

The current collector may be selected from a copper foil, a nickel foil, a stainless steel foil, a titanium foil, a nickel foam, a copper foam, a polymer substrate coated with a conductive metal, a combination thereof, etc.

The rechargeable lithium battery may further include a separator between the negative electrode and the positive electrode. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

EXAMPLES

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Examples 1 and 2 and Comparative Examples 1 to 6

A 4.4 V cell was manufactured by using $LiCoO_2$ as a positive electrode, artificial graphite as a negative electrode, and an electrolyte having a composition provided in Table 1 below.

In Table 1, EC indicates ethylene carbonate, PC indicates propylene carbonate, DEC indicates diethyl carbonate, MP indicates methyl propionate, EP indicates ethyl propionate, and PP indicates propyl propionate. SN indicates succinonitrile, and HTCN indicates 1,3,6-hexane tricyanide.

TABLE 1

| | Lithium salt | Solvent (volume %) | | | | | | Additive (wt %) | |
|---|---|---|---|---|---|---|---|---|---|
| | ($LiPF_6$) | EC | PC | DEC | MP | EP | PP | SN | HTCN |
| Example 1 | 1.15M | 20 | 10 | — | — | 30 | 40 | 1 | 2 |
| Example 2 | 1.15M | 20 | 20 | — | — | — | 60 | 1 | 2 |
| Comparative Example 1 | 1.15M | 20 | 20 | 60 | — | — | — | 3 | — |
| Comparative Example 2 | 1.15M | 20 | 20 | 60 | — | — | — | 1 | 2 |
| Comparative Example 3 | 1.15M | 20 | 10 | — | — | 30 | 40 | 3 | — |
| Comparative Example 4 | 1.15M | 20 | 20 | — | — | — | 60 | 3 | — |
| Comparative Example 5 | 1.15M | 20 | 20 | — | 60 | — | — | 1 | 2 |
| Comparative Example 6 | 1.15M | 20 | 20 | — | — | 60 | — | 1 | 2 |

Examples 1 and 2 used an electrolyte composition including a solvent including propyl propionate, a lithium salt, and 1,3,6-hexane tricyanide. Comparative Example 1 used a composition including neither propyl propionate nor 1,3,6-hexane tricyanide. Comparative Example 2 used a composition omitting propyl propionate but including 1,3,6-hexane tricyanide, and Comparative Examples 3 and 4 used a composition including propyl propionate but omitting 1,3,6-hexane tricyanide. Comparative Example 5 used a composition including methyl propionate instead of propyl propionate, and Comparative Example 6 used a composition including ethyl propionate instead of propyl propionate.

Evaluation 1: Linear Sweep Voltammetry (LSV) Evaluation of Cell

LSV for the electrolytes according to Examples 1 and 2 and Comparative Examples 1 to 6 was measured by using a Pt electrode, and the results are provided in FIG. 2 below. Herein, a rate was 0.1 mV/sec, and a voltage was in a range of 3 V to 7 V.

Figure 2:
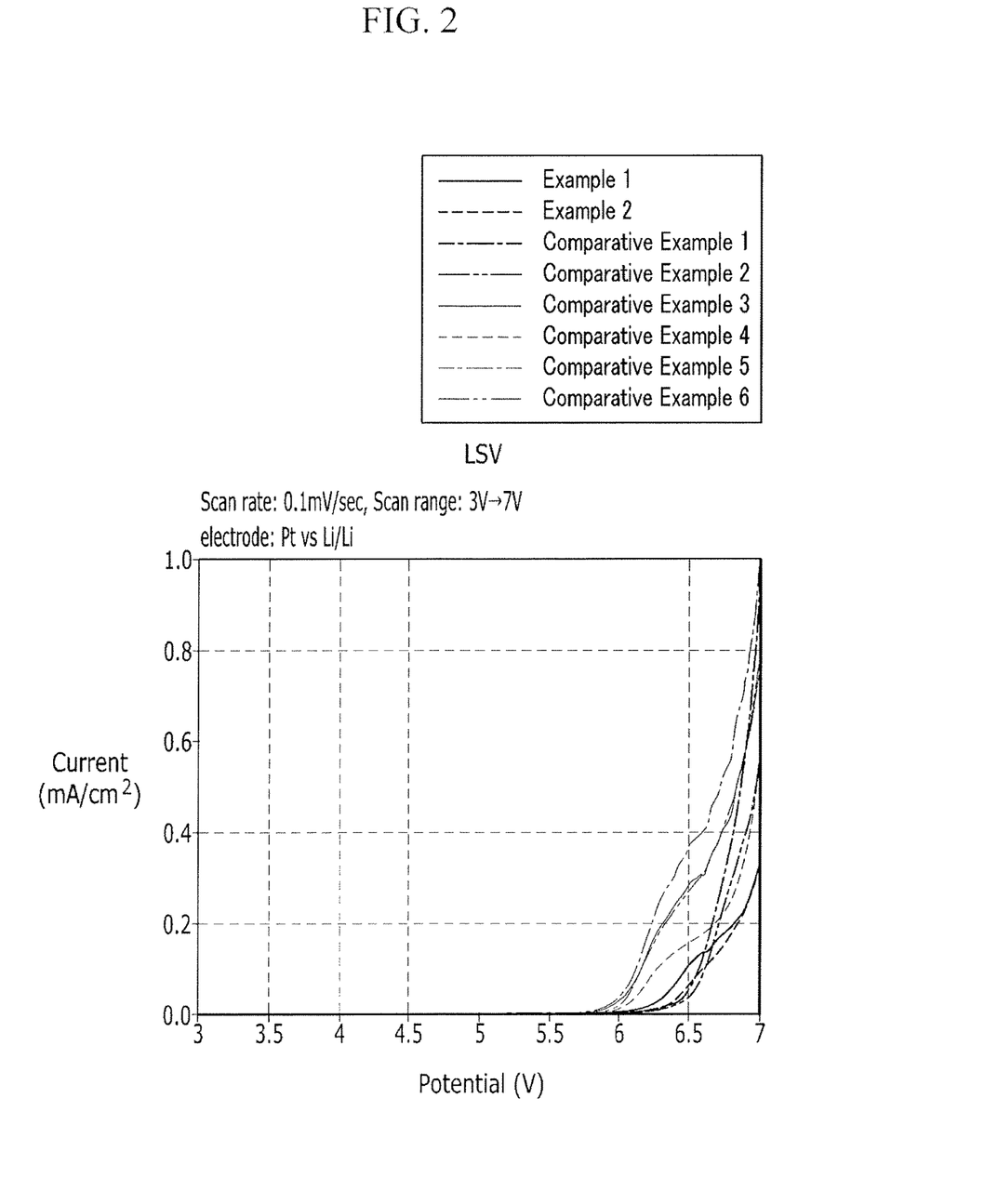
FIG. 2 illustrates a graph showing the linear sweep voltammetry evaluation of cells according to Examples and Comparative Examples.

Referring to FIG. 2, Examples 1 and 2 showed a lower oxidation current at a higher voltage as compared with Comparative Examples. Resultantly, the Examples were suppressed from an oxidation reaction of an electrolyte solution at a high voltage.

Evaluation 2: Thickness Change and Capacity Evaluation of Prismatic Cell During Storage at High Temperature Each 4.4 V prismatic cell according to Examples 1 and 2 and Comparative Examples 1 to 6 was allowed to stand at 60° C. for 4 weeks, and then, its thickness variation ratio and recovery capacity were evaluated, and the results are provided in Table 2 and FIGS. 3 and 4.

TABLE 2

| | Initial capacity [mAh] | Capacity after being allowed to stand at 60° C. for 4 weeks [mAh] | Recovery capacity [%] | Initial thickness [mm] | Thickness after being allowed to stand at 60° C. for 4 weeks [mm] | Thickness variation ratio [%] |
|---|---|---|---|---|---|---|
| Example 1 | 2930 | 2620 | 89.4% | 5.37 | 5.88 | 9.5% |
| Example 2 | 2928 | 2635 | 90.0% | 5.38 | 5.76 | 7.0% |
| Comparative Example 1 | 2934 | 2275 | 77.5% | 5.39 | 6.68 | 23.9% |
| Comparative Example 2 | 2935 | 2504 | 85.3% | 5.40 | 6.14 | 13.7% |
| Comparative Example 3 | 2925 | 2512 | 85.9% | 5.38 | 6.21 | 15.4% |
| Comparative Example 4 | 2920 | 2535 | 86.8% | 5.42 | 6.18 | 14.0% |
| Comparative Example 5 | 2942 | 2478 | 84.2% | 5.39 | 6.35 | 17.8% |
| Comparative Example 6 | 2938 | 2500 | 85.1% | 5.40 | 6.10 | 13.0% |

Figure 3:
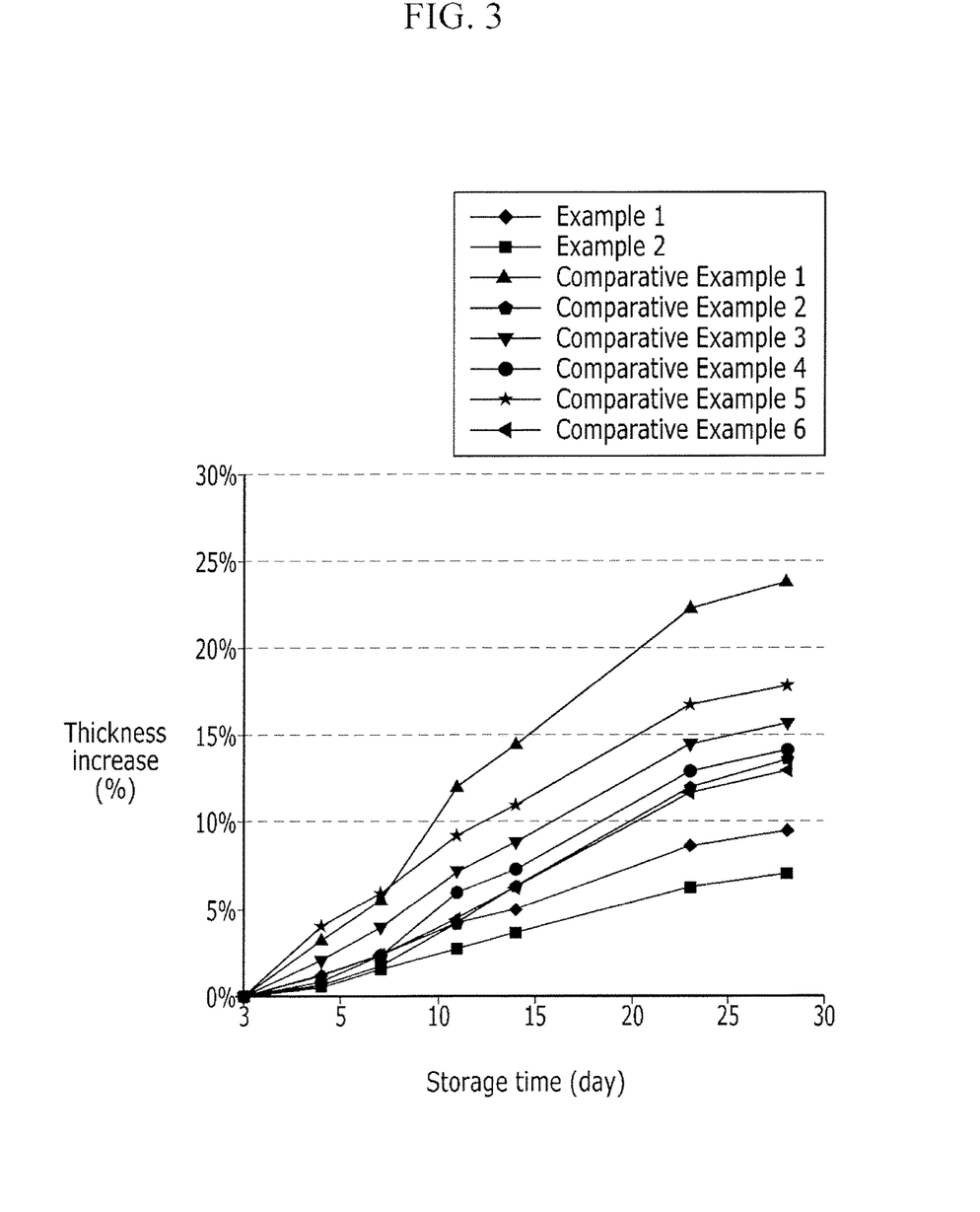
FIG. 3 illustrates a graph showing thickness variation ratios of prismatic cells according to Examples and Comparative Examples when stored at a high temperature.
Figure 4:
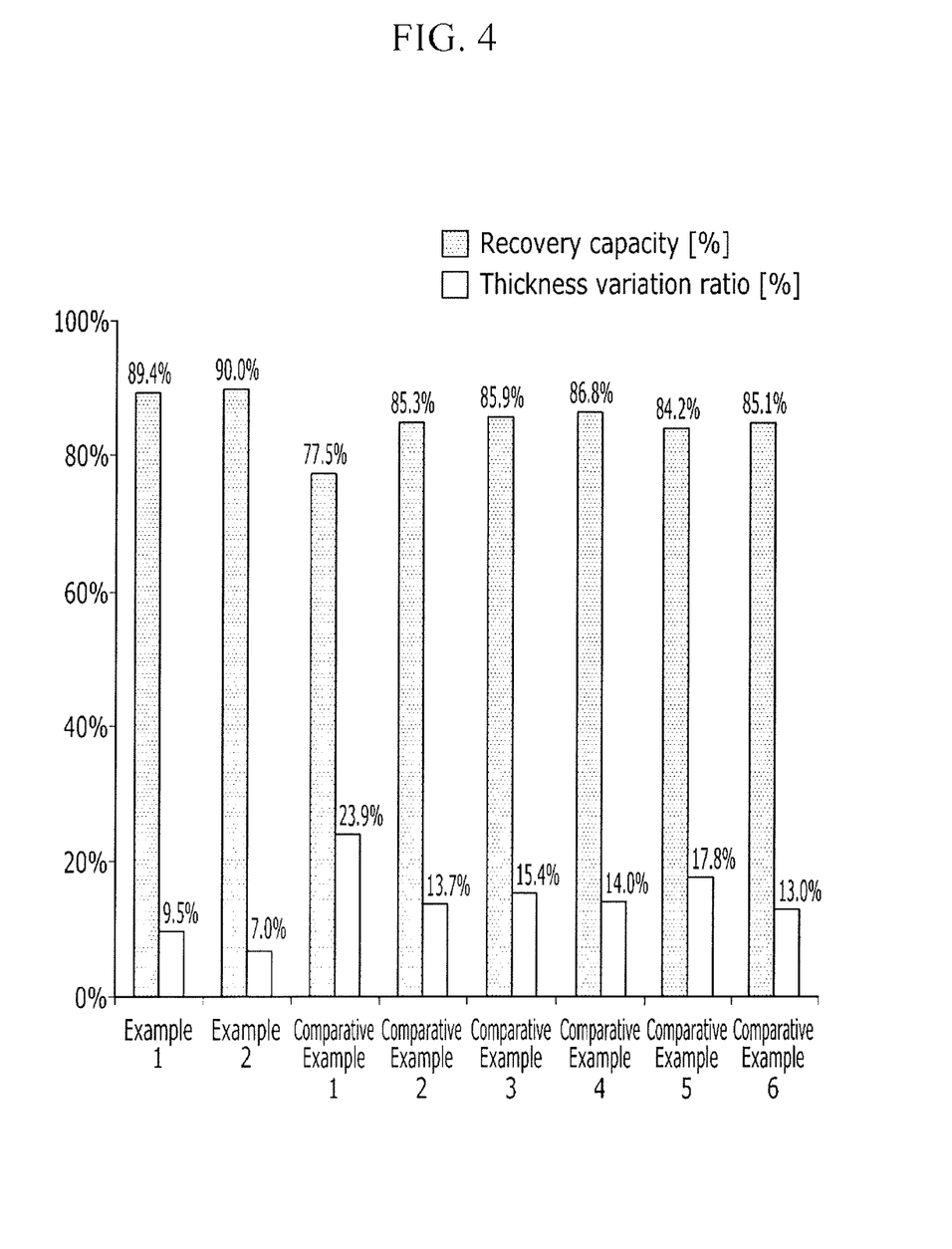
FIG. 4 illustrates a graph showing the thickness variation ratios and capacity retentions of the prismatic cells according to Examples and Comparative Examples when stored at a high temperature.

Referring to Table 2 and FIGS. 3 and 4, the Examples showed a much lower thickness variation ratio after allowed to stand at 60° C. for 4 weeks and thus were much more effectively suppressed from a swelling phenomenon and a higher capacity retention at a high temperature than the Comparative Examples.

Evaluation 3: Thickness Change and Capacity Evaluation of Pouch Cell During Storage at High Temperature Thickness variation ratio and recovery capacity of each 4.4 V pouch cell according to Examples 1 and 2 and Comparative Examples 1 to 6 were measured after being allowed to stand at 60° C. for 3 weeks, and the results are provided in Table 3 below and FIGS. 5 and 6.

TABLE 3

|  | Initial capacity [mAh] | Capacity after being allowed to stand at 60° C. for 4 weeks [mAh] | Recovery capacity [%] | Initial thickness [mm] | Thickness after being allowed to stand at 60° C. for 4 weeks [mm] | Thickness variation ratio [%] |
|---|---|---|---|---|---|---|
| Example 1 | 2230 | 2093 | 93.9% | 3.30 | 3.60 | 9.1% |
| Example 2 | 2225 | 2116 | 95.1% | 3.30 | 3.56 | 7.9% |
| Comparative Example 1 | 2230 | 1920 | 86.1% | 3.30 | 5.30 | 60.4% |
| Comparative Example 2 | 2229 | 2011 | 90.2% | 3.32 | 4.45 | 34.2% |
| Comparative Example 3 | 2220 | 2007 | 90.4% | 3.27 | 4.65 | 42.1% |
| Comparative Example 4 | 2225 | 2009 | 90.3% | 3.29 | 4.55 | 38.4% |
| Comparative Example 5 | 2245 | 1986 | 88.5% | 3.33 | 4.98 | 49.5% |
| Comparative Example 6 | 2238 | 2002 | 89.5% | 3.31 | 4.24 | 28.1% |

Figure 5:
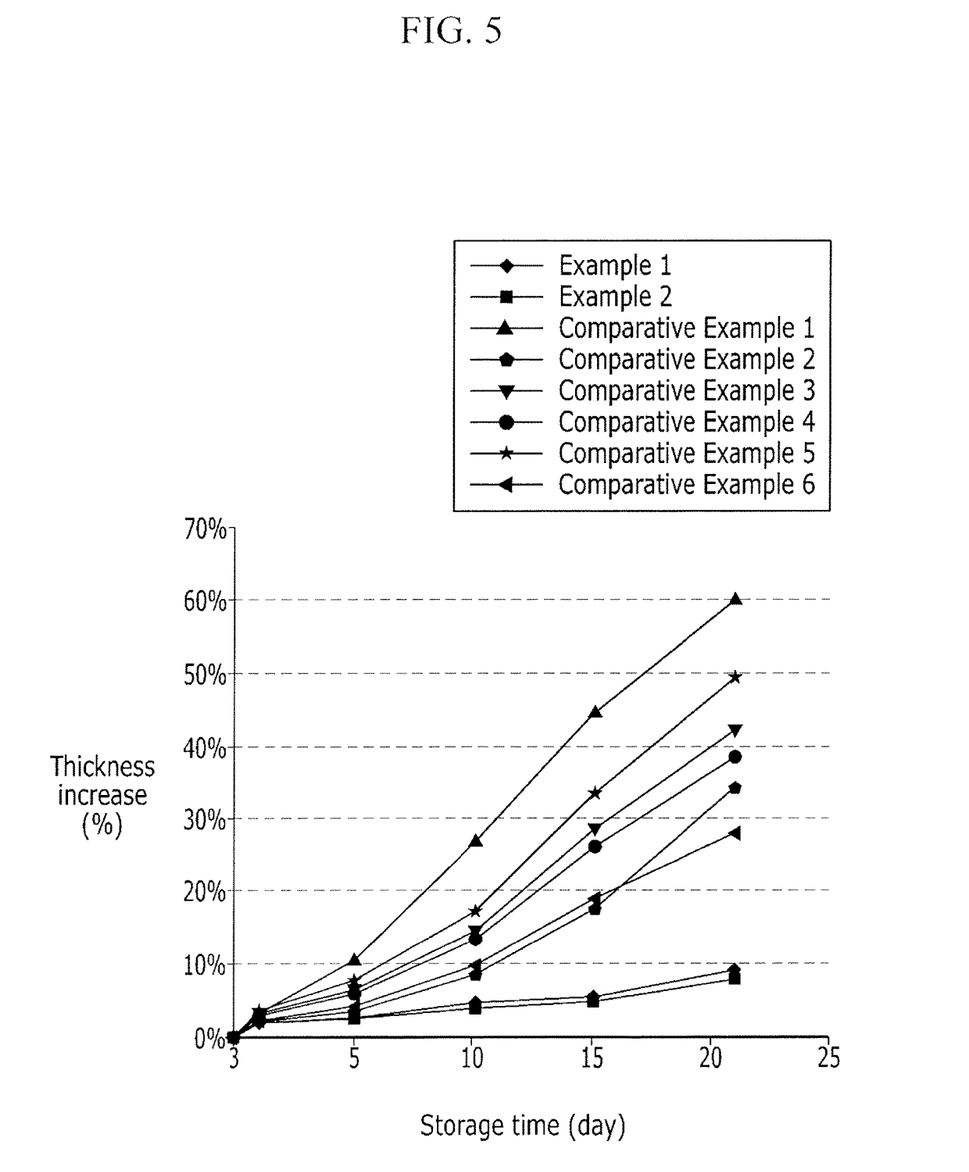
FIG. 5 illustrates a graph showing the thickness variation ratios of pouch cells according to Examples and Comparative Examples when stored at a high temperature.
Figure 6:
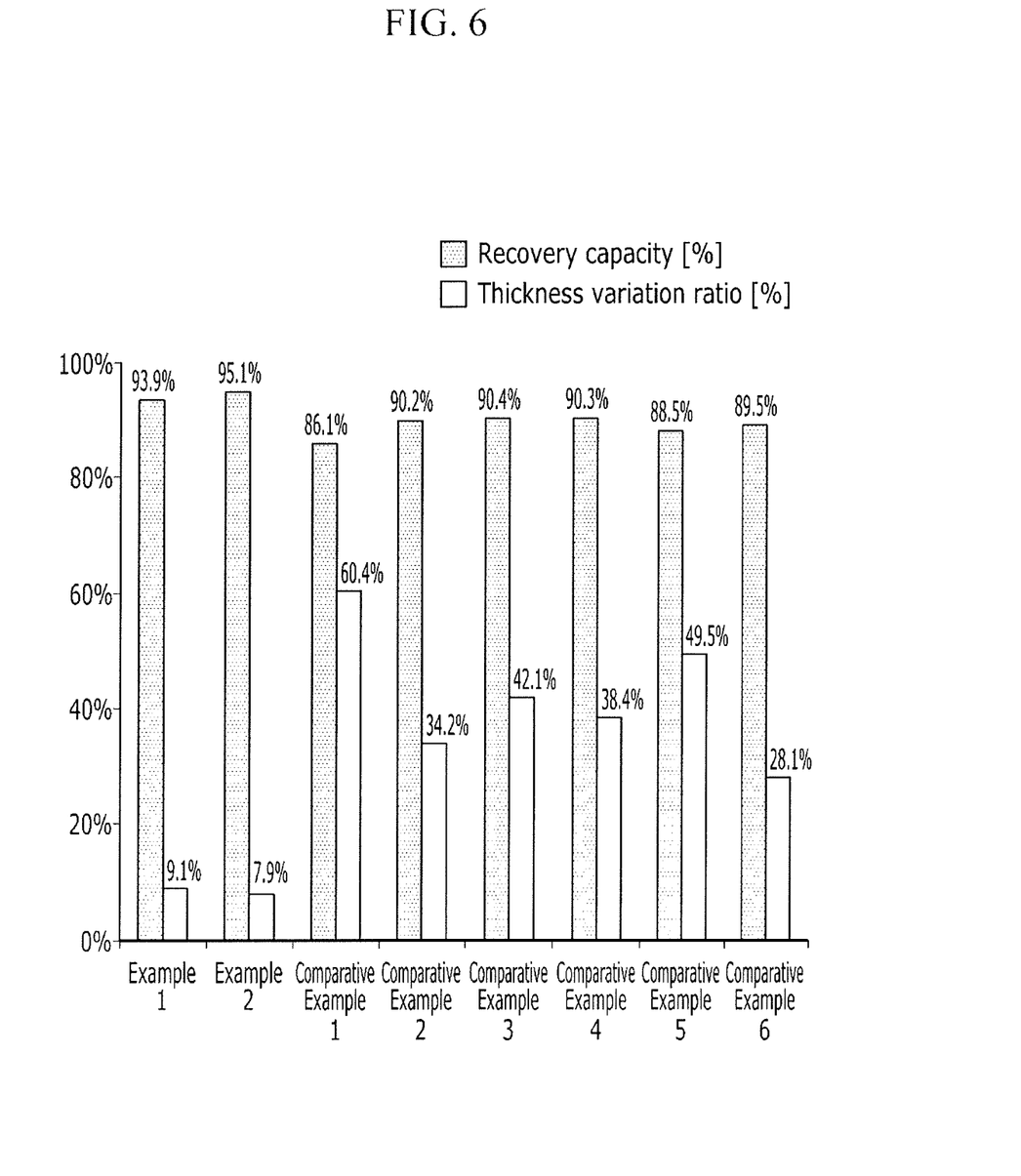
FIG. 6 illustrates a graph showing the thickness variations ratio and capacity retentions of the pouch cells according to Examples and Comparative Examples when stored at a high temperature.

Referring to Table 3 and FIGS. 5 and 6, the pouch cells according to the Examples showed much lower thickness variation ratio after allowed to stand at 60° C. for 3 weeks, that is, much more effectively suppressed from being swollen at a high temperature, and much higher capacity retention than the pouch cells according to the Comparative Examples.

Evaluation 4: Cycle Life Characteristics

Figure 7:
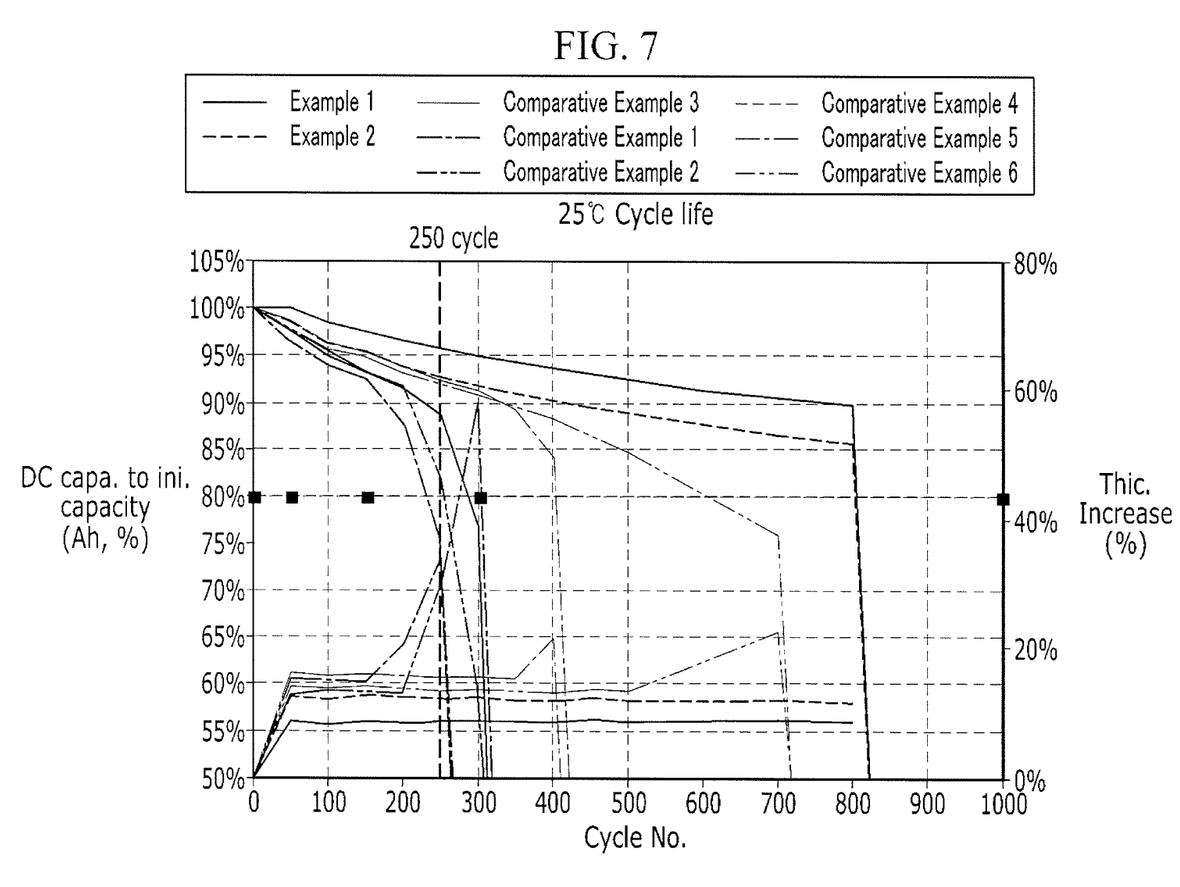
FIG. 7 illustrates a graph showing cycle life characteristics of the pouch cells according to Examples and Comparative Examples.

Cycle life characteristics at room temperature and thickness change of each 4.4 V pouch cell according to Examples 1 and 2 and Comparative Examples 1 to 6 were measured after cycling, and the results are provided in Table 4 and FIG. 7.

TABLE 4

|  | initial capacity [mAh] | Capacity after 250 cycles [mAh] | Capacity retention | Initial thickness [mm] | Thickness after 250 cycles [mm] | Thickness variation ratio |
|---|---|---|---|---|---|---|
| Example 1 | 2112 | 2021 | 95.7% | 3.32 | 3.61 | 8.7% |
| Example 2 | 2109 | 1956 | 92.7% | 3.30 | 3.60 | 9.2% |
| Comparative Example 1 | 2040 | 1532 | 75.1% | 3.27 | 4.39 | 34.4% |
| Comparative Example 2 | 2099 | 1720 | 82.0% | 3.25 | 4.23 | 30.2% |
| Comparative Example 3 | 2061 | 1895 | 92.0% | 3.28 | 3.73 | 13.6% |
| Comparative Example 4 | 2105 | 1870 | 88.9% | 3.29 | 3.71 | 12.8% |
| Comparative Example 5 | 2122 | 1608 | 75.8% | 3.26 | 3.78 | 15.7% |
| Comparative Example 6 | 2060 | 1551 | 75.3% | 3.28 | 3.73 | 13.6% |

Referring to Table 4 and FIG. 7, the Examples showed much higher capacity retention after 250 cycles and a very low cell thickness variation ratio compared with the Comparative Examples. Accordingly, a battery cell manufactured by applying the electrolyte solution according to the Examples showed significantly improved cycle life characteristics at a high voltage.

Succinonitrile may be used to protect a positive electrode and thus improve performance at a high temperature and stop a voltage drop during a formation process. Succinonitrile may increase polarity, and since a nitrile group therein may have a strong bond with a transition metal on the surface of the positive electrode, the bond between metal and ligand may suppress various interface side reactions and have an effect on suppressing gas generation, blocking a minor short path, and the like. Additional improvements are desired, however.

As described above, example embodiments may provide an electrolyte for a rechargeable lithium battery capable of improving impregnation of an electrolyte solution and mobility of lithium ions in a high voltage rechargeable lithium battery, and effectively suppressing gas generation at a high temperature by suppressing a side reaction with a positive electrode. Embodiments also provide a rechargeable lithium battery manufactured using the electrolyte.

The electrolyte for a rechargeable lithium battery according to an embodiment may have excellent impregnation about an active material and excellent mobility of lithium ions, may help suppress a side reaction with the positive electrode, and thus may effectively suppress gas generation under a high temperature condition. A rechargeable lithium battery manufactured by using the electrolyte may exhibit excellent cycle life characteristics and high storage capacity at a high voltage and a high temperature, and may be suppressed from swelling.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An electrolyte for a rechargeable lithium battery, the electrolyte comprising:
   an organic solvent including C3 to C5 alkyl propionate;
   a lithium salt; and
   a compound represented by Chemical Formula 1:

[Chemical Formula 1]

wherein, in Chemical Formula 1, k, l, and m are independently integers of 0 to 20, k, l, and m being selected so that Chemical Formula 1 has an asymmetric structure, n is an integer of 1 to 7, and $R^1$, $R^2$, $R^3$, $R^4$, $R^5$, and $R^6$ are independently hydrogen, an alkyl group, an alkoxy group, or a fluoroalkyl group, and wherein the compound represented by Chemical Formula 1 is included in an amount of about 0.05 wt % to about 10 wt % based on the total weight of the electrolyte for a rechargeable lithium battery.

2. The electrolyte as claimed in claim 1, wherein the C3 to C5 alkyl propionate is included in an amount of about 10 volume % to about 80 volume % based on the total amount of the organic solvent.

3. The electrolyte as claimed in claim 2, wherein the C3 to C5 alkyl propionate includes one or more of propyl propionate, N-butyl propionate, tert-butyl propionate, isobutyl propionate, N-pentyl propionate, 2-pentyl propionate, tert-pentyl propionate, or isopentyl propionate.

4. The electrolyte as claimed in claim 1, wherein the compound represented by Chemical Formula 1 includes one or more of hexane tricyanide having an asymmetric structure, or pentane tricyanide having an asymmetric structure.

5. The electrolyte as claimed in claim 4, wherein the electrolyte further includes succinonitrile.

6. The electrolyte as claimed in claim 1, wherein in Chemical Formula 1, n is an integer of 1 to 5, and k, l, and m are independently integers of 0 to 10.

7. The electrolyte as claimed in claim 1, wherein in Chemical Formula 1, n is an integer of 1 to 3, and k, l, and m are independently integers of 0 to 7.

8. The electrolyte as claimed in claim 1, wherein in Chemical Formula 1, n is 1 or 2, k is 0, and l and m are independently integers of 1 to 5.

9. The electrolyte as claimed in claim 1, wherein in Chemical Formula 1, k, l, and m are different integers from each other.

10. The electrolyte as claimed in claim 1, wherein the lithium salt includes $LiPF_6$, $LiBF_4$, $LiSbF_6$, $LiAsF_6$, $LiN(SO_2CF_3)_2$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein x and y are natural numbers, LiCl, LiI, $LiB(C_2O_4)_2$, or a combination thereof.

11. The electrolyte as claimed in claim 1, wherein a concentration of the lithium salt is about 0.1 M to about 2.0 M.

12. The electrolyte as claimed in claim 1, wherein the electrolyte for a rechargeable lithium battery includes one or more additives selected from fluoroethylene carbonate, vinylethylene carbonate, succinonitrile, polysulfone, and a combination thereof.

13. A rechargeable lithium battery comprising:
   a negative electrode including a negative active material,
   a positive electrode including a positive active material, and
   the electrolyte as claimed in claim 1.

14. The rechargeable lithium battery as claimed in claim 3, wherein the rechargeable lithium battery is operated at a voltage of about 4.4 V or greater.

* * * * *